United States Patent [19]

Barneck

[11] 3,879,662
[45] Apr. 22, 1975

[54] DIFFERENTIAL AMPLIFIER SLIDING REFERENCE
[75] Inventor: Charles A. Barneck, Bountiful, Utah
[73] Assignee: The United States of America as represented by the Secretary of the Army, Washington, D.C.
[22] Filed: June 18, 1974
[21] Appl. No.: 480,450

[52] U.S. Cl. ............... 324/98; 307/235; 340/248 A
[51] Int. Cl. ...................... G01r 17/02; H03k 5/20
[58] Field of Search ...... 324/98, 133, 102; 307/235; 340/248 B, 248 C, 248 A; 317/31, 148.5 R

[56] References Cited
UNITED STATES PATENTS
3,178,698  4/1965  Graham ............................ 307/235

Primary Examiner—Alfred E. Smith
Assistant Examiner—Ernest F. Karlsen
Attorney, Agent, or Firm—Eugene E. Stevens, III; Robert P. Gibson; Daniel D. Sharp

[57] ABSTRACT

A tolerance detector circuit comprising a differential amplifier circuit for comparing a signal to be measured with a reference voltage, a level sensor to indicate when the signal level differs from the desired values, and a means for allowing the reference voltage to slide or vary to achieve the desired in-tolerance range, while retaining the inherently high sensitivity of the differential amplifier.

9 Claims, 3 Drawing Figures

DIFFERENTIAL AMPLIFIER SLIDING REFERENCE

BACKGROUND OF THE INVENTION

The differential amplifier is commonly employed as a nulling device to indicate when a voltage or signal being monitored is or is not equal to a certain voltage magnitude — otherwise known as a reference or comparison voltage. The null or balance condition occurs when the monitored voltage is equal to the reference voltage, in which condition, both sides of the differential amplifier are conducting equally and are thus in balance with eath other. Owing to the high sensitivity inherent in the differential amplifier, a very narrow null region can be achieved quite simply, thus permitting a very close comparison of the monitored (input) voltage and the reference voltage. Such characteristics make the differential amplifier an ideal device for detecting whether or not a voltage has varied from a desired value.

A tolerance detector is employed to indicate either when a voltage is equal to a desired voltage, or has not varied from that desired voltage magnitude by more than some acceptable amount. The acceptable variation may differ in each case because of nature of the voltage or signal being monitored. The range of magnitudes between the most positive and the most negative voltages acceptable is called the "in-tolerance" range, and is comparable to the null region of the differential amplifier.

The ideal tolerance detector is one in which the two edges of the in-tolerance range can be set independently, in which the width of the range can be varied from the very narrow to very wide, and in which sensitivity with which it detects the change or switchover from an in-tolerance condition to an out-of-tolerance condition remains equally high at any setting, and yet is simple and trouble free.

The normal differential amplifier is very sensitive, simple, and trouble free; however, widening out the null region requires operation outside of its linear range, which decreases its sensitivity. The sensitivity decreases because variation of the monitored voltage level by more than a very small amount from the reference voltage level causes one side of the differential amplifier to begin saturating and the other side to begin cutting off (stop conducting). The differential amplifier also becomes very sensitive to temperature changes; that is, its characteristics change as the ambient temperature changes.

SUMMARY OF THE INVENTION

In accordance with the invention, these problems are overcome by means of a sliding reference voltage circuit. The sliding reference circuit permits the reference voltage to slide or vary as the monitored voltage varies, thus permitting the differential amplifier circuit to remain in a balanced or null condition as long as the monitored voltage level remains within a pre-set, acceptable, in-tolerance range. Within this range the circuit has a very low gain. Adjustable clamping circuits included within the sliding reference circuit act to limit sliding of the reference voltage and thus return the circuit to a high-gain condition when the reference voltage reaches either limit. The sliding reference circuit thus greatly widens the balance or near-balance region, retaining good temperature stability over the entire in-tolerance range. By using the sliding reference feature, therefore, one can greatly increase the versatility of the differential amplifier, enabling its use in tolerance-detector and in other applications where high gain is needed at widely separated points.

A comparison made between a conventional differential amplifier tolerance detector with a fixed reference voltage and one with the sliding reference circuit of the invention indicates clearly the superiority of the latter. The differential amplifier circuit with a fixed reference voltage had a near-balance region approximately 0.50 volt wide. With a narrow in-tolerance range wholly within this 0.50 volt region, that is, 0.240 volt wide, a change from an in-tolerance or GO to an out-of-tolerance or FAIL indication was obtained when the monitored voltage had exceeded the edge of the in-tolerance range by 0.002 to 0.005 volt. When the temperature was varied from 70° to 125°F., the level of the edges or switchover points varied by as much as 0.040 volt. Then, when the circuit was used to monitor a voltage whose in-tolerance range was 1.980 volts wide (with both edges of the in-tolerance range outside of the linear range of the differential amplifier, a change of 0.014 volt at the edges produced a switchover from GO to FAIL, and the levels of the switchover points varied over the same temperature range by as much as 0.140 volt. The differential amplifier tolerance detector with a sliding reference circuit according to the invention had characteristics over the entire 1.980-volt range superior to those of the other circuit just within the 0.240-volt range. Switchover was obtained with a 0.001 to 0.005-volt change and the levels varied over the temperature range by only 0.035 volt.

Other methods of adjustment of the reference voltage, both manual and automatic, which are presently used in some measuring instruments, might be employed to adapt the differential amplifier for service as a tolerance detector. Switching of the reference voltage, as is done in differential voltmeters or in digital voltmeters, could be used to achieve somewhat similar results to those achieved by the sliding reference circuit. However, any such switching technique requires complex switching circuitry. Automatic switching as in digital voltmeters, which would also be required to duplicate the capability of the sliding reference circuit, also requires switch drive circuitry.

DETAILED DESCRIPTION OF THE DRAWINGS

Figure 1:
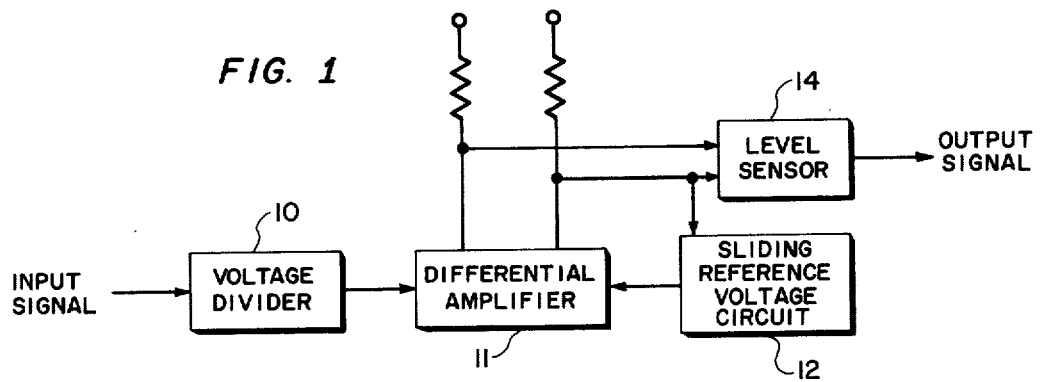
Figure 2:
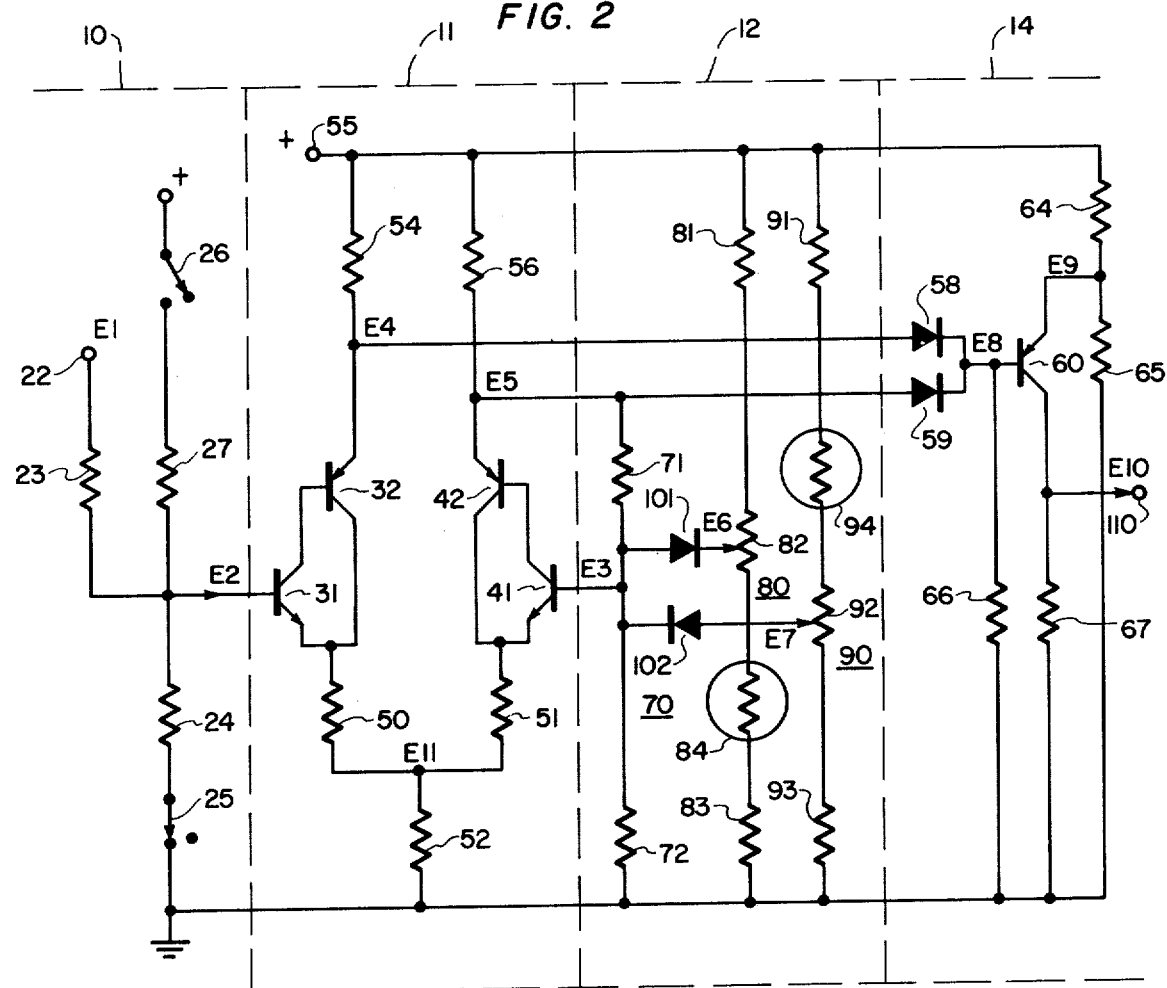
Figure 3:
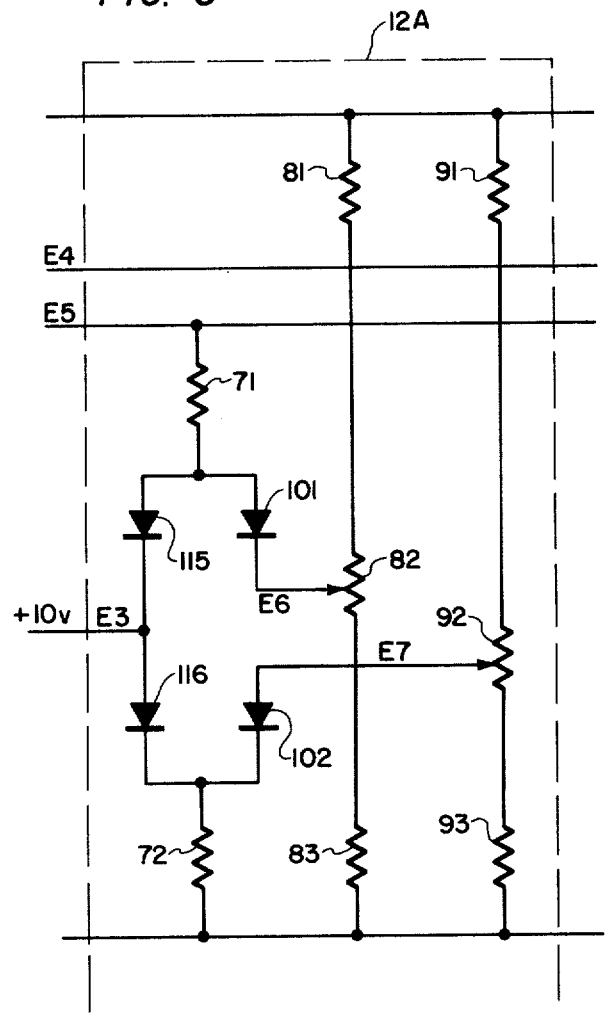

FIG. 1 is a block diagram of a differential amplifier tolerance detector incorporating the sliding reference circuit; and FIG. 2 is a complete circuit diagram of the tolerance detector of FIG. 1; incorporating one version of the sliding reference circuit; and FIG. 3 is a circuit diagram of another version of the sliding reference circuit of FIG. 2.

DETAILED DESCRIPTION OF THE PREFERRED EMBODIMENT

Referring to FIG. 1, the signal or voltage to be monitored is applied as an input signal to the voltage divider 10 which changes the level of the input signal to one suitable as an input to the specific differential amplifier 11 to be used. The differential amplifier 11 also responds to a comparison or reference voltage derived from the sliding reference voltage circuit 12, to be described in detail subsequently. When, and only when, the voltage to be monitored falls within an in-tolerance range predetermined by the settings of the sliding reference voltage circuit 12, a level sensor 14 at the outputs of the differential amplifier circuit 11 responds in such a way as to produce a "high" or GO output signal.

Referring to FIG. 2, the voltage E1 to be monitored is applied to terminal 22 of either of two voltage divider networks, depending upon whether the level E1 of the input signal is more or less positive than the differential amplifier nominal input level E2. For input signals E1 more positive than the nominal level E2, the voltage divider network 10 comprises resistors 23 and 24; this voltage divider network configuration is achieved by closing switch 25 and opening switch 26, as shown in FIG. 2. For example, if one desires to measure or monitor a voltage E1 of 18.6 volts and the nominal value of voltage E2 is 10 volts, then, if resistor 24 has a value of 26.1 kilohms, the value of resistor 23 should be 22.4 kilohms, which results in voltage E2 being at $(26.1/48.5) \times 18.6 = 10$ volts. On the other hand, for input signals E1 less positive than the nominal voltage level E2, the voltage divider network 10 comprises resistors 23 and 27; this configuration is achieved by closing switch 26 and opening switch 25. For example, if one desires to monitor a voltage E1 of 2.6 volts, if the positive terminal 55 is at 20.0 volts, and if the value of resistor 27 is 26.1 kilohms, then to obtain a voltage level E2 of 10.0 volts, the value of resistor 23 should be 19.3 kilohms. The voltage level E2 then becomes $(26.1/45.4) \times (20.0 - 2.6) = 10.0$ volts. When the voltage level E1 becomes more positive or negative, voltage level E2 also becomes more positive or negative in proportion to the voltage divider resistances.

The differential amplifier 11 consists of two complementary symmetry, compound-connected amplifiers coupled together through a common emitter circuit, which compare voltage levels E2 and E3, sense any difference between the two levels, and amplify this difference, producing a much greater difference between voltage levels E4 and E5. The particular differential amplifier circuit of FIG. 2, comprising the two symmetrically connected pairs of transistors 31, 32 and 41, 42 is shown by way of example, and provides relatively high gain compared with a differential amplifier circuit using only two transistors. The emitters of transistors 31 and 41 are connected to the negative power supply terminals, herein shown as ground, though respective isolating resistors, 50 and 51 and the common load resistor 52; the latter serves as a constant current generator, when the differential amplifier is in a high-gain state, for producing the differential action. The collectors of transistors 31 and 41 are connected to the bases of transistors 32 and 42, whose emitters are connected to the positive power supply terminal 55 through respective resistors 54 and 56. The collector currents of transistors 32 and 42 flow to ground through the common load resistor 52. The stepped-down input voltage level E2 is applied to the base of transistor 31, while the reference voltage level E3 is applied to the base of transistor 41. Output voltages E4 and E5 are at the emitters of transistors 32 and 42, respectively. When voltage E2 becomes more positive than voltage E3, the base current of transistor 31 increases, which causes an increase of the collector current thereof; this collector current of transistor 31 is also the base current of transistor 32. This action causes the collector current of transistor 32 also to increase. This increased current through resistor 52 increases the voltage level E11 developed across it, and in turn causes the emitter voltage of transistor 41 to become more positive. If voltage level E3 is held constant by a strong reference voltage divider, then conduction through transistors 41 and 42 decreases. The increased current through transistors 31 and 32 is almost exactly equal to the decreased current through transistors 41 and 42, thus maintaining an almost constant voltage level E11 at the emitters of transistors 31 and 41. These opposite current changes cause voltage levels E4 and E5 to become less positive and more positive, respectively. Similarly, when voltage level E2 becomes less positive than voltage level E3, opposite changes in voltages and currents occur, which cause voltage levels E4 and E5 to become more positive and less positive, respectively.

The level sensor 14 comprises a switching transistor 60 whose emitter is held at voltage level E9 by voltage divider resistors 64 and 65. The base current of transistor 60 flows to ground through resistor 66, and the collector current of transistor 60 produces an output voltage level E10 at terminal 110 as it flows to ground through resistor 67. When the differential amplifier 11 is in a null or balanced condition, the voltage level E8 is held slightly less positive than level E9, and more positive than either of voltage levels E4 or E5. Diodes 58 and 59 block any current which would otherwise flow from E8 through the differential amplifier. With switching transistor 60 conducting the output voltage level E10 is in a high or GO condition. However, if voltage levels E2 and E3 differ sufficiently from each other, then either voltage level E4 or voltage level E5 will become more positive than voltage level E9, causing transistor 60 to be cut off and the output voltage level E10 to decrease to a "low" or FAIL condition.

The sliding reference circuit 12 comprises three voltage dividers 70, 80, and 90, and two clamping diodes, 101 and 102. The voltage divider 70 is a high impedance, weak voltage divider consisting of resistors 71 and 72, which provide the easily varied reference voltage E3. Voltage dividers 80 and 90 are low impedance, strong dividers comprising resistors 81, 82, 83, 84 and 91, 92, 93, and 94, respectively; these dividers provide adjustable upper and lower limiting reference voltages E6 and E7, respectively. Voltage dividers 80 and 90 are coupled to voltage divider 70 through diodes 101 and 102. These diodes 101 and 102 are normally back biased and do not conduct, because voltage level E3 is less positive than upper limiting voltage level E6, and more positive than lower limiting voltage level E7. Voltage level E3 may vary easily between voltage levels E6 and E7. When voltage level E3 becomes more positive than E6 by enough to cause diode 101 to conduct, then voltage level E3 is clamped by that conduction and prevented from any further increase. Or, when the voltage level E3 becomes less positive than voltage level E7 by an amount sufficient to cause diode 102 to conduct, then voltage level E3 is clamped and prevented from any further decrease. Resistor 71 is connected to the point of voltage level E5 instead of to the positive power supply terminal 55 to take advantage of the slight changes in voltage level E5 to aid variation of voltage level E3. The best response is obtained when resistors 71 and 72 have enough resistance that the current through 72 is the same order of magnitude as the base current of transistor 41.

When the level of the voltage to be monitored has been determined, then the values of resistors 23 and 24 or 27 are selected to obtain the desired nominal voltage level E2 with switches 25 and 26 being set as required. Resistors 82 and 92 are set, establishing the upper and lower limiting voltage levels E6 and E7 at the magnitudes corresponding to the upper and lower acceptable limits of monitored voltage level E1 (as stepped down to voltage level E2). While the monitored voltage level E1 remains at its nominal value voltage levels E2 and E3 are equal, as are voltage levels E4 and E5, and transistor 60 is on, producing a GO level E10 at the output terminal 110. If voltage level E1 being monitored becomes more positive, then voltage level E2 will increase proportionately, causing an increased current through transistors 31 and 32, and an increased voltage drop across resistors 52 and 54. Concurrently, voltage level E4 will decrease, and voltage level E11 will increase. The increase in voltage level E11 reduces the base current of transistor 41, which, in turn, reduces the voltage drop across resistor 71, thus permitting voltage level E3 to rise. With the differential amplifier 11 in the low-gain state, when voltage level E3 follows E2, resistor 52 does not act as a constant current device. The slightly reduced conduction through transistors 41 and 42, which is caused by the decrease in the base current of transistor 41, also causes voltage E5 to rise slightly; this also contributes to the rise in voltage level E3 through resistor 71. If voltage level E1 increases in magnitude to a level equal to its upper acceptable limit, voltage level E3 will follow voltage level E2 until it reaches the level at which it is clamped by voltage E6. This action changes differential amplifier 11 to a high-gain state. Any further increase in the monitored voltage level E1 will cause voltage level E5 to rise sharply, the rise being sensed by the level sensor, resulting in a low or FAIL output at terminal 110. In contrast to the case of an increase in voltage level E1, a decrease in voltage level E1 causes a decrease in voltage level E11. This decrease produces an increase in base current of transistor 41; this current flows through resistor 71 and causes voltage level E3 to decrease. The resulting increased current flow through transistors 41 and 42 cause voltage level E5 to decrease, thereby contributing to the decrease in voltage level E3 through resistor 71. Because voltage level E11 decreases, the increase in voltage level E4 is slight. When voltage E1 decreases to and exceeds its lower acceptable limit, voltage E3 decreases until clamped by voltage E7, which changes differential amplifier 11 from a low-gain to a high-gain state. Because voltage level E1 has decreased past its lower acceptable limit, voltage level E4 is caused to rise sharply, this increase being sensed by level sensor 14, and causing a low or FAIL voltage level E10 at output terminal 110.

To better illustrate the operation of the invention by way of further explanation, certain resistance and power supply voltage values will be given — these values are those actually used in an operative embodiment of the invention. The positive power supply terminal is at plus 20 volts with respect to ground (the negative power supply terminal). Voltage levels E2 and E3 are held at plus 10 volts, voltage levels E4 and E5 at plus 15 volts, and voltage level E9 at the emitter of the switching transistor 60 is maintained at plus 16 volts, by their respective voltage dividers and by transistor conduction.

Note that, with the values of resistors 71 and 72 at 51 kilohms and 100 kilohms, making a total of 151 kilohms, and with voltage level E5 at plus 15 volts, one obtains a current flow of about $(1.5 \times 10)/(1.51 \times 10^5)$ or 99.3 microamperes. If one assumes a base current for transistor 41 of about one-half microampere, the ratio of voltage divider current to base current would be about $(99.3/0.5) = 198.6$. If, on the other hand, one were to replace voltage divider 70 with voltage divider 80, wherein the resistance values for resistors 81, 82, 83, and 84 were 6810 ohms, 5000 ohms, 8250 ohms, and 210 ohms, one would obtain a current flow of about $(2.0 \times 10)/(2.027 \times 10^4)$ or 986.7 microamperes. The current ratio now would be $(986.7/0.5) = 1,973.4$. It is clear, therefore, that if one had used a voltage divider with smaller resistors, such as voltage divider 80, voltage level E3 would be held much more firmly than when using a voltage divider with larger resistors, such as divider 70. Thus, voltage dividers 80 and 90 maintain firm control of voltage levels E6 and E7, while divider 70 maintains less firm control, permitting voltage level E3 to vary.

The specific values chosen for the resistors in voltage divider 80 and 90 depend upon where one wants to set voltage levels E6 and E7, how wide one desires the ranges of adjustment of E6 and E7, and, for temperature compensating resistors 84 and 94, how much change in voltage is required. (See later discussion on temperature compensation techniques.) Because voltage level E6 will always be more positive than voltage level E7, resistors 81 and 93 may be much larger in value than resistors 83 and 91. One must not make potentiometers 82 and 92 too large, however, since the accuracy with which they could be set would be inadequate.

Assume for example, that voltage level E6 is set at 11 volts by means of potentiometer 82, and that voltage level E7 is set at 9 volts by means of potentiometer 92. The voltage E3 will follow any variation in voltage E2 between the limits of 9 and 11 volts. The output level E10 will be 10 volts. If E2 should become more positive than 11 volts, voltage E3 would be clamped at 11 volts by E6, and differential amplifier 11 would be converted to a high gain device, causing voltage E4 to decrease and voltage E5 to increase. The increase in voltage E5 would cause current to flow through diode 59, which would cause voltage E8 to increase also. The increase in voltage E8 would turn off transistor 60, causing voltage E10 to decrease to 0 volts, indicating that voltage level E1 had exceeded its acceptable high limit. Or, if voltage E2 should become less positive than 9 volts, voltage E3 would be clamped at 9 volts by voltage E7, and differential amplifier 11 would be converted to a high gain mode, causing voltage E4 to increase and voltage E5 to decrease. The increase in voltage E4 would cause current to flow through diode 58, which would cause voltage E8 to increase. This increase in voltage E8 would turn off transistor 60, causing output voltage level E10 to decrease to 0 volts, indicating that voltage level E1 had exceeded its acceptable lower limit.

All resistors used in the invention are low temperature-coefficient resistors to minimize the effects of variations in ambient temperature on circuit operating characteristics.

Transistors 31 and 41 compensate each other, as do transistors 32 and 42. However, because differences in characteristics of these mutually compensating transistors would affect the amount of compensation obtained, and because two separate transistors could be at different temperatures, especially those operating at very low current levels, transistors 31 and 41 are a closed matched set, mounted in the same case. Transistors 32 and 42 are also closely matched, though separate.

Diodes 58 and 59, in addition to blocking current flow from the base of transistor 60 back to the emitter circuits of transistors 32 and 42, and being quite similar to the emitter-base junction of transistor 60, serve to compensate for variations in $V_{be}$ of transistor 60 caused by temperature changes. Resistor 66 is selected so that the base current of transistor 60 is equal to the current which is required through either diode 58 or 59 to turn off transistor 60.

Resistors 84 and 94 are positive temperature-coefficient resistors which compensate for diodes 101 and 102. The decrease in voltage drop across diode 101 or 102, which would occur with an increase in temperature, and which would decrease the actual level at which voltage E3 would be clamped, is matched by an increase in voltage drop across resistors 84 and 94. Level E6 is caused to increase and level E7 is caused to decrease by the same amount that diodes 101 and 102 change, thus holding the upper and lower clamping limits of level E3 fairly constant.

The compensation achieved by resistors 84 and 94 is not as good as could be desired; their rate of variation with temperature, while close to that of diode 101 and 102, does differ somewhat. The sliding reference circuit 12 of FIG. 2 can be modified, as indicated by circuit 12A of FIG. 3, to achieve superior compensation. The addition of diodes 115 and 116 provide the compensation of symmetry, and resistors 84 and 94 can be removed.

The entire circuit of FIG. 2, or the circuit of FIG. 2 as modified by FIG. 3, can be mounted on an integrated circuit chip, with the exception of potentiometers 82 and 92, and resistors 23, 24, and 27, which depend upon the exact level of input voltage to be monitored.

What is claimed is:

1. A tolerance detector for indicating whether the voltage level of an input signal to be monitored lies within presettable upper and lower limits comprising a differential amplifier responding to said input signal and to a reference voltage and having a pair of output circuits, a voltage level sensing means having an input circuit coupled to said differential amplifier output circuits and having mutually exclusive high and low output voltage states, adjustable sliding reference voltage circuit means in circuit with said reference voltage input to the differential amplifier for clamping said reference voltage level to one of said presettable upper and lower limits only when the level of said input signal exceeds the corresponding upper or lower limit, one of said two differential amplifier output voltages exceeding a predetermined magnitude only during said clamping, said level sensing means attaining the low level output state in response to a differential amplifier output voltage exceeding said predetermined magnitude and attaining the high level output state during absence of said clamping.

2. A tolerance detector according to claim 1 wherein said input circuit of the level sensing means is coupled to the differential amplifier output circuits by way of diodes which are nonconducting when the level of said input signal lies within the aforesaid limits.

3. A tolerance detector according to claim 2 wherein said level sensing means is a transistor whose input electrode is at a voltage sufficient to bias the transistor into conduction when said diodes are nonconducting and at a voltage sufficient to cutoff the transistor when either of said diodes is conducting.

4. A tolerance detector according to claim 1 wherein said sliding reference voltage circuit means includes a high impedance voltage divider for establishing said reference voltage and permitting said reference voltage to follow closely changes in voltage level of said signal to be monitored while said signal voltage level lies within said presettable limits.

5. A tolerance detector according to claim 4 further including a first low impedance adjustable voltage divider for establishing a first voltage level equal to said upper limit, and a second adjustable low impedance voltage divider for establishing a second voltage level equal to said lower limit.

6. A tolerance detector according to claim 1 wherein said sliding reference voltage circuit means includes a first low impedance adjustable voltage divider for establishing a first voltage level equal to said upper limit, a first diode having an anode connected to said reference input circuit and a cathode connected to said first voltage and a second low impedance adjustable voltage divider for establishing a second voltage level equal to said lower limit and a second diode having a cathode connected to said reference input circuit and an anode connected to said second voltage.

7. A tolerance detector according to claim 6 wherein said first and second diodes are nonconducting when the level of said input signal lies within the aforesaid limits.

8. A tolerance detector according to claim 6 wherein said first and second diodes constitute clamping means for preventing variation of said reference voltage beyond said corresponding upper or lower limit.

9. A tolerance detector according to claim 1 wherein said differential amplifier includes a common load resistor which serves as a variable signal coupling element when the level of said input signal lies within said limits and serves as a constant current generator when said input voltage exceeds said limits.

* * * * *